US012761576B2

(12) United States Patent
Kim et al.

(10) Patent No.: US 12,761,576 B2
(45) Date of Patent: Oct. 13, 2026

(54) CHARGING MEMBERS

(71) Applicant: Hewlett-Packard Development Company, L.P., Spring, TX (US)

(72) Inventors: Taehyun Kim, Seongnam Si (KR); Ara Kim, Seongnam Si (KR); Yunhyung Bae, Seongnam Si (KR); Se Young Yoon, Seongnam Si (KR); Youngphil Ji, Seongnam Si (KR); Yong-Sang Ryu, Seongnam Si (KR)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 18/996,447

(22) PCT Filed: Jul. 29, 2022

(86) PCT No.: PCT/US2022/038799
§ 371 (c)(1),
(2) Date: Jan. 17, 2025

(87) PCT Pub. No.: WO2024/025551
PCT Pub. Date: Feb. 1, 2024

(65) Prior Publication Data

US 2026/0016769 A1 Jan. 15, 2026

(51) Int. Cl.
*G03G 15/02* (2006.01)

(52) U.S. Cl.
CPC ................................ *G03G 15/0233* (2013.01)

(58) Field of Classification Search
CPC ..................... G03G 15/0233; G03G 2215/025
See application file for complete search history.

(56) References Cited

U.S. PATENT DOCUMENTS 7,289,756 B2 10/2007 Hasegawa et al.
10,585,372 B2 3/2020 Fujino et al.
2018/0101107 A1 4/2018 Tomomizu et al.
2019/0346786 A1* 11/2019 Mori .................. G03G 15/0233
2019/0346788 A1 11/2019 Fujino et al.
2020/0301306 A1* 9/2020 Kinuta ............... G03G 21/1835
2023/0144220 A1* 5/2023 Harada ................... C08L 67/04
399/176

FOREIGN PATENT DOCUMENTS

EP 3306409 A1 4/2018
WO 2021/145924 A1 7/2021
WO 2022/081148 A1 4/2022

* cited by examiner

*Primary Examiner* — Carla J Therrien
(74) *Attorney, Agent, or Firm* — Dierker & Kavanaugh, P.C.

(57) ABSTRACT

An example charging member has a conductive support; a conductive elastic body layer on the conductive support; and a surface layer on the conductive elastic body layer, wherein the surface layer includes a binder resin and particles, wherein the surface layer includes a first portion of the binder resin having the particles and a second portion of the binder resin having an absence of the particles, and wherein the second portion has a peak height (Spk)/core roughness depth (Sk) of less than 0.2.

14 Claims, 2 Drawing Sheets

CHARGING MEMBERS

BACKGROUND

An electrophotographic imaging apparatus includes a photoconductor and a charging member such as a charging roller, a developing roller, or a transfer roller, which are provided around the photoconductor. The charging member charges a surface of the photoconductor to a predetermined voltage.

An electrostatic latent image corresponding to print data is formed on the charged surface of the photoconductor with light emitted from an exposure unit. The developing roller supplies a developer to the photoconductor to develop the electrostatic latent image into a developer image. The developer image is transferred by the transfer roller onto an image receiving member passing between the photoconductor and the transfer roller.

BRIEF DESCRIPTION OF DRAWINGS

Various examples will be described below with reference to the following figures.

DETAILED DESCRIPTION

When an electrostatic latent image is formed, a contact charging method may be used in which a charging roller contacts a photoconductor to charge a surface of the photoconductor as an image carrier. In an example, an electroconductive roller may be used as the charging roller. In this example method, a surface of the photoconductor is charged by applying a voltage to a conductive support (e.g., a shaft) using the charging roller to perform a micro discharge in the vicinity of a contact nip between the charging roller and the photoconductor. The charging roller may have a structure in which a conductive elastic body layer is formed on the conductive support (e.g., a shaft) and a surface layer or resistance layer is formed on the conductive elastic body layer. In some examples, a charging member includes a conductive support, a conductive elastic body layer directly on the conductive support, and a surface layer directly on the conductive elastic body layer, as detailed herein.

Through use in a contact charging method, a charging member (e.g., charging roller) may electrically deteriorate due to surface wear over time. In that case, charging performance may also deteriorate over time. When charging performance deteriorates, a charging ability of the charging member may be reduced, and image defects such as background (BG) defects and micro-jitter (fine horizontal stripes) defects may occur. In particular, micro-jitter and 2D noise can have inversely proportional characteristics, and thus satisfying both can be challenging. For instance, if larger particles (beads) are used it has been determined that an amount of micro-jitter may be satisfied, but 2D noise occurs. Conversely, if smaller particles are used, an amount of 2D noise is satisfied, but micro-jitter occurs.

Hereinafter, an example charging member and an electrophotographic imaging apparatus and an electrophotographic cartridge including the charging member will be described. Notably, the charging member herein can satisfy both micro-jitter and 2D noise, and yet is durable to provide a long operational lifetime and is electrically suitable for an electrophotographic imaging apparatus. A description will be made based on a charging roller as an example. However, the following description may be equally applied to a charging member having a shape other than a roller, such as a corona charger or a charging brush.

A charging member according to an example includes a conductive support, a conductive elastic body layer, and a surface layer as an outermost layer.

Figure 1:
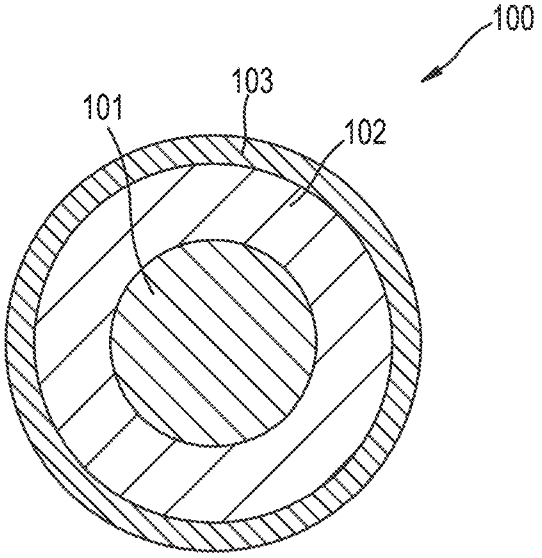
FIG. 1 is a cross-sectional view schematically illustrating an example of a charging member according to an example.

FIG. 1 is a schematic cross-sectional view of an example of a charging member according to an example. Referring to FIG. 1, in a charging roller 100, a conductive elastic body layer 102 and a surface layer 103 are provided on an outer circumference surface of a conductive support 101 having a shaft shape. The conductive elastic body layer 102 and the surface layer 103 may be provided in this order from an inner side in the diameter direction of the charging roller 100 toward the outer side in the diameter direction of the charging roller 100. In an example, the conductive elastic body layer 102 and the surface layer 103 may be integrally laminated on the outer circumference surface of the conductive support 101. An intermediate layer (not shown) such as a resistance adjustment layer for increasing voltage resistance (i.e., leak resistance) may be formed between the conductive elastic body layer 102 and the surface layer 103.

In an example imaging apparatus, the charging roller 100 shown in FIG. 1 is provided as a charging means for charging a body to be charged, and may function as a charging means for charging the surface of the photoconductor as an image carrier.

Conductive Support

In an example, the conductive support 101 includes a metal having electrical conductivity. For example, a metallic hollow body (a pipe shape) or a metallic solid body (a rod shape) including iron, copper, aluminum, nickel, or stainless steel may be used. An outer circumference surface of the conductive support 101 may be plated for reducing or preventing rust or to provide scratch resistance. The outer circumference surface of the conductive support 101 may be plated to a degree that does not impair electrical conductivity. Further, the outer circumference surface of the conductive support 101 may be coated with an adhesive, a primer, or the like to increase adhesion to the conductive elastic body layer 102. In this case, to provide electrical conductivity, this adhesive, primer, etc. in itself may be made electrically conductive.

The conductive support 101 may have a cylindrical shape having a diameter of about 4 mm to about 20 mm, for example, about 5 mm to about 10 mm and having a length of about 200 mm to about 400 mm, for example, about 250 mm to about 360 mm.

Conductive Elastic Body Layer

In an example, the conductive elastic body layer 102 may have elasticity suitable for securing uniform adhesion to the photoconductor. For example, the conductive elastic body layer 102 may be formed using a binder resin selected from natural rubbers, synthetic rubbers such as ethylene-propylene-diene monomer rubber (EPDM), styrene-butadiene rubber (SBR), a silicone rubber, a polyurethane-based elastomer, epichlorohydrin (ECO) rubber, isoprene rubber (IR), butadiene rubber (BR), acrylonitrile-butadiene rubber (NBR), hydrogenated NBR (H-NBR), and chloroprene rubber (CR), and synthetic resins such as an amide resin, a urethane resin, and a silicone resin. These may be used alone or in combination of two or more. In an example, as epichlorohydrin (ECO) rubber containing ethylene oxide (EO) residue in its molecule has ionic conductivity and is relatively low and stable in electrical resistance, the epichlorohydrin (ECO) rubber may be used as a binder resin. The conductive elastic body layer 102 may contain epichlorohydrin rubber, and may contain epichlorohydrin rubber as a main component. In an example, the conductive elastic body layer 102 may contain epichlorohydrin rubber in an amount of about 50.0 wt % or more or about 90.0 wt % or more.

The charging roller 100 may be in contact with a photoconductor (e.g., electrophotographic photoconductor drum 311 of FIG. 3) when used in a contact developing method, and may be spaced apart from the photoconductor when used in a non-contact developing method.

In the case of a one-component contact developing method, the conductive elastic body layer 102 may be adjusted to have a hardness of about 25 to about 45 as measured by an Asker-A TYPE durometer, and in the case of an one-component non-contact developing method, the conductive elastic body layer 102 may be adjusted to have a hardness of about 40 to about 65 as measured by an Asker-A TYPE® durometer. In other examples, the hardness may be determined according to a printer speed, lifetime, cost, etc., and the hardness may vary depending on the developing method.

The conductive elastic body layer 102 may have a thickness of about 0.5 mm to about 8.0 mm, for example, about 1.25 mm to about 3.00 mm. Within the thickness range, the charging roller 100 exhibits elasticity and recovery against deformation, and a stress imparted on toner may be reduced. In the case of the one-component non-contact developing method, the thickness of the conductive elastic body layer 102 may be about 0.5 mm to about 2.0 mm, and in the case of the one-component contact developing method, the thickness of the conductive elastic body layer 102 may be about 1.5 mm to about 8.0 mm.

The conductive elastic body layer 102 may include a conductive agent. The conductive agent may include an ion-conducting agent and an electron-conducting agent. The conductive elastic body layer 102 may include an ion-conducting agent in consideration of resistance stability. Since the ion-conducting agent may be uniformly dispersed in a polymer elastic body to make the electrical resistance of the conductive elastic body layer 102 uniform, uniform charging may be obtained even when the charging roller 100 is charged using a DC voltage.

The ion-conducting agent may be selected depending on the purpose. Examples of the ion-conducting agent may include alkali metal salts, alkaline earth metal salts, perchlorates of quaternary ammonium, chlorates, hydrochlorides, bromates, iodates, hydroborates, sulfates, trifluoromethyl sulfates, sulfonates, and trifluoromethane sulfonates. These may be used alone or in combination of two or more. The alkali metal salts may be selected depending on the purpose. Examples thereof may include lithium salts, sodium salts, and potassium salts. These may be used alone or in combination of two or more. Examples of the lithium salts may include $Li[B(C_{14}H_{10}O_3)_2]$, $Li(CF_3SO_2)_2N$, $Li(C_2F_5SO_2)_2N$, $LiClO_4$, $LiBF_4$, $LiPF_6$, $LiCF_3SO_3$, $LiAsF_6$, and $LiC_4F_9SO_3$.

Examples of the quaternary ammonium salts may include cationic surfactants such as lauryltrimethylammonium chloride, stearyltrimethylammonium chloride, octadecyltrimethylammonium chloride, didecyldimethylammonium chloride, hexadecyltrimethylammonium chloride, trioctylpropylammonium bromide, tetrabutylammonium chloride, and behenyltrimethylammonium chloride, amphoteric surfactants such as lauryl betaine, stearyl betatine, dimethyl lauryl betaine, and tetraethyl ammonium perchlorate, tetrabutyl ammonium perchlorate, and trimethyl octadecyl ammonium perchlorate, or the like.

The amount of the ion-conducting agent used may be in a range of about 0.01 parts by weight to about 10 parts by weight, or in a range of about 0.5 parts by weight to about 5 parts by weight, based on 100 parts by weight of the binder resin. These ion-conducting agents may be used alone or in combination of two or more.

The electron-conducting agent may be used in combination with the ion-conducting agent. As the electron-conducting agent, for example, carbon black may be used. Examples of the carbon black may include conductive carbon black such as oxidized carbon black for use in ink to improve dispersibility, ketjen black, and acetylene black, carbon black for rubber such as SAF, ISAF, HAF, FEF, GPF, SRF, FT, and MT grades, and pyrolytic carbon black, natural graphite, and artificial graphite. As the electron-conducting agent, for example, metal oxides such as antimony-doped tin oxide, indium tin oxide (ITO), tin oxide, titanium oxide, zinc oxide, metals such as nickel, copper, silver, and germanium, electrically conductive polymers such as polyaniline, polypyrrole, and polyacetylene, and conductive whiskers such as carbon whisker, graphite whisker, titanium carbide whisker, conductive potassium titanate whisker, conductive barium titanate whisker, conductive titanium oxide whisker, and conductive zinc oxide whisker may be used. To reduce a difference in electrical resistance and to reduce a hardness, a small amount of the electron-conducting agent may be used. The amount of the electron-conducting agent used may be in a range of about 50 parts by weight or less, for example, in a range of about 15 parts by weight or less, based on 100 parts by weight of the binder resin.

The resistance value of the conductive elastic body layer 102 by the combination of the conducting agent may be adjusted to about 103 Q to about $10^{11}\Omega$, and may be adjusted to about $10^4\Omega$ to about $10^9\Omega$. When the resistance value of the conductive elastic body layer 102 is less than $10^3\Omega$, the charges on the photoconductor may leak and thus an imbalance in electrical resistance may occur to cause spots on an image, or hardness may increase to make uniform contact with the photoconductor difficult, and image stains may occur. When the resistance value of the conductive elastic body layer 102 is more than $10^{11}\Omega$, background (B/G) image defects may occur.

A hardness (ASKER-C) of the conductive elastic body layer 102 may be in a range of about 30° to about 99°. For example, a thickness of the conductive elastic body layer 102 may be in a range of about 0.5 mm to about 20 mm. When the thickness of the conductive elastic body layer 102 is within this range, the charging roller may have an excellent elasticity, recovery from deformation of a roller base material may be secured.

The conductive elastic body layer 102 may contain additives such as a filler, a foaming agent, a crosslinking agent, a crosslinking accelerator, a lubricant, and/or an auxiliary agent. The crosslinking agent may include sulfur. The crosslinking accelerator may include tetramethylthiuram disulfide (CZ). The lubricant may include stearic acid. The auxiliary agent may include zinc oxide (ZnO).

Surface Layer

The surface layer 103 may include a binder resin and particles, as described herein, dispersed in the binder resin.

The surface layer 103 can additionally include an ion-conducting agent and/or an electron-conducting agent, such as those described herein.

For example, the surface layer 103 can include an electron conducting agent in the form of electroconductive particles including carbon black such as KETJEN BLACK® EC and acetylene black; carbon black for rubber such as Super Abrasion Furnace (SAF), Intermediate Super Abrasion Furnace (ISAF), High Abrasion Furnace (HAF), Extra Conductive Furnace (XCF), Fast Extruding Furnace (FEF), General Purpose Furnace (GPF), Semi Reinforcing Furnace (SRF), Fine Thermal (FT) and Medium Thermal (MT); oxidation-treated carbon black for color ink; metal particles of copper, silver, or germanium, and/or metal oxide particles. For instance, carbon black that may be employed to control a conductivity of the surface layer 103. For example, an amount of the electroconductive particles may be in a range of about 1 part to about 50 parts by weight based on 100 parts by weight of the binder resin.

The surface layer 103 can include an ion-conducting agent in the form of an ion conductive material in the binder resin. Examples of the ion conductive material include an inorganic ion conductive material such as sodium perchlorate, lithium perchlorat, calcium perchlorate, or lithium chloride; an organic ion conductive material such as modified aliphatic dimethylaluminum isosulfate or stearylammonium acetate; or a mixture thereof. An amount of the ion conductive material may be in a range of about 1 part to about 50 parts by weight based on 100 parts by weight of the resin.

Figure 2:
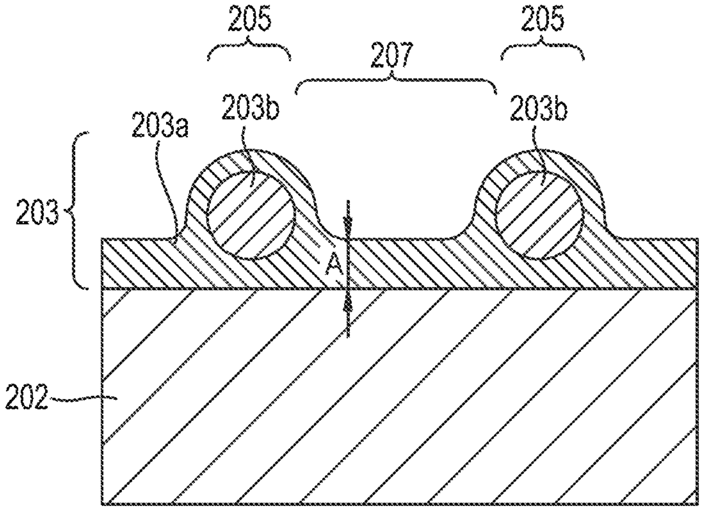
FIG. 2 is a cross-sectional view schematically illustrating an enlarged surface layer of an example of a charging member according to an example.

FIG. 2 is a schematic cross-sectional view illustrating an enlarged surface layer of a charging member according to an example.

Referring to FIG. 2, the surface layer 203 may contain a urethane resin as a binder resin 203*a*, which forms a matrix material, and may contain particles 203*b* having an average particle diameter of about 1 μm to about 35 μm, for example, having an average particle diameter of about 18 μm to about 27 μm. As used herein, the average particle diameter refers to refers to the diameter of a spherical particle, or the average diameter of a non-spherical particle (e.g., the average of multiple diameters across the non-spherical particle).

Urethane resin is a polymer having a urethane bond. For example, urethane resin may include an isocyanate moiety including an isocyanate group and a polyol moiety including a hydroxyl group. Examples of the isocyanate moiety may include trilene diisocyanate (TDI), 4,4'-methylene diphenyl diisocyanate (MDI), polymeric MDI, modified MDI, naphthalene 1,5-diisocyanate, trizine diisocyanate, hexamethylene diisocyanate, isophorone diisocyanate, p-phenylene diisocyanate, trans-cyclohexane-1,4-diisocyanate, xylene diisocyanate (XDI), hydrogenated XDI, hydrogenated MDI, lysine diisocyanate, triphenylmethane triisocyanate, tris (isocyanate phenyl) thiophosphate, tetramethyl xylene diisocyanate, lysine ester triisocyanate, 1,6, 11-undecane triisocyanate, 1,8-diisocyanate-4-isocyanatemethyl octane, 1,3, 6-hexamethylene triisocyanate, bicyclo heptane triisocyanate, trimethylhexamethylene diisocyanate, block-type isocyanate (having a structure in which isocyanate is masked with a blocking agent), or a combination thereof. The block-type isocyanate does not react at room temperature, but when heated to a temperature at which the blocking agent dissociates, an isocyanate group may be re-produced in the block-type isocyanate. These may be used as a single material or as a combination of at least two selected therefrom. Examples of the polyol moiety may include polyoxypropylene glycol, polytetramethylene ether glycol, THF-alkylene oxide copolymer polyol, polyester polyol, acrylic polyol, polyolefin polyol, a partially hydrolysate product of a ethylene-vinyl acetate copolymer, phosphate-based polyol, halogen-containing polyol, adipate-based polyol, polycarbonate polyol, polycaprolactone-based polyol, polybutadiene polyol, or a combination of at least two selected therefrom.

The urethane resin material may further include a catalyst if necessary. Examples of the catalyst may include triethylamine, N,N,N',N'-tetramethyl-ethylenediamine, N,N,N',N'',N''-pentamethyldiethylenetriamine, triethylenediamine, dimethylaminoethanol, bis(2-methylaminoethyl) ether, or a combination of at least two selected therefrom. An amount of the catalyst may be, for example, in a range of about 0.05 part to about 5 parts by weight based on 100 parts by weight of the total of polyol components and isocyanate components. The urethane resin material may further include an additional resin and a functional additive.

Examples of the additional resin may include styrene resin, acryl resin, vinyl chloride resin, styrene-vinyl acetate copolymer, modified maleic acid resin, phenol resin, epoxy resin, polyester resin, fluorine resin, low-molecular weight polyethylene, low-molecular weight polypropylene, ionomer resin, polyurethane resin, nylon resin, silicon resin, ketone resin, ethylene-ethyl acrylate copolymer, xylene resin, polyvinyl butyral resin, or a combination of at least two selected therefrom. Particularly, urethane resin, nylon resin, acryl resin, or fluorine resin may be used as they have excellent abrasion resistance, toner charging property, and toner transporting property. The functional additive may be, for example, a conductive agent such as carbon black or metal oxide; a stabilizing agent; or a combination thereof.

The binder resin 203*a* may be selected to avoid contamination of the photoconductor, which is a body to be charged. Examples of the binder resin may include a fluorine resin, a polyamide resin, an acrylic resin, a nylon resin, a urethane resin, a silicone resin, a butyral resin, styrene-ethylene/butylene-olefin copolymer (SEBC), and olefin-ethylene/butylene-olefin copolymer (OEBC). These may be used alone or in combination of two or more. In an example, the binder resin may be selected from a fluorine resin, an acrylic resin, a nylon resin, a urethane resin, and a silicone resin. The binder resin may be selected from a nylon resin and a urethane resin. The binder resin may contain a urethane resin.

When the binder resin contains urethane resin, the urethane resin may be formed by a chain extension reaction of a polyol mixture of polyester polyol and polyether polyol with a polyisocyanate.

The urethane resin formed by the chain extension reaction of a polyester polyol with a polyisocyanate has excellent wear resistance at relatively low hardness. However, since the urethane resin obtained by using a polyester polyol may deteriorate at low temperature, when the urethane resin is used for a long period of time under low-temperature environments, electrical resistance may vary, and a background (B/G) image may occur. Further, since an ester-based urethane may be vulnerable to hydrolysis, when the ester-based urethane is used under high-temperature and high-humidity environments, its properties may change.

The urethane resin formed by the chain extension reaction of a polyether polyol with a polyisocyanate has low-temperature flexibility, has relatively low electrical resistance, and thus has stability. However, a polyester polyol and a polyether polyol have poor compatibility and may thus cause separation or curing difficulties. When a polyether polyol having an ethylene oxide (EO) content of about 60 wt % to about 90 wt % is used, compatibility with a polyester polyol may be addressed. The polyether polyol having an ethylene oxide (EO) content of about 60 wt % to about 90 wt % may have good compatibility with a polyester polyol. In addition, the surface layer 203 produced using this urethane resin may have low-temperature flexibility, relatively low electrical resistance, physical stability, and resistance stability at low hardness.

The surface layer 203 may include a urethane resin formed by a chain extension reaction of a polyol mixture of a polyester polyol and a polyether polyol having an ethylene oxide (EO) content of about 60 wt % to about 90 wt % with a polyisocyanate. The content ratio of a polyester polyol and a polyether polyol may be adjusted in a range of 8:2 to 2:8. When the content ratio of any one of the polyester polyol and polyether polyol is too low, improvement effects may be reduced.

As the polyester polyol, a polycaprolactam-based polyol, an adipic acid-based polyol, or the like may be used. The polyester polyol may be obtained by an esterification reaction between a compound having two or more hydroxyl groups and a polybasic acid, or may be obtained by a ring-opening addition reaction of cyclic esters such as ε-caprolactone, β-butyrolactone, γ-butyrolactone, γ-valerolactone, and δ-valerolactone using a compound having two or more hydroxyl groups as an initiator. Although polylactone-based polyols may be distinguished from polyester polyols, here, they are considered as a kind of the polyester polyols.

Examples of the aforementioned compound having two or more hydroxyl groups may include glycol compounds such as ethylene glycol, propylene glycol, 1,3-propanediol, 1,4-butanediol, 1,5-pentanediol, 1,6-hexanediol, diethylene glycol, triethylene glycol, tetraethylene glycol, dipropylene glycol, tripropylene glycol, 1,4-cyclohexanedimethanol, glycol compounds having a branched structure such as 2-methyl-1,5-pentane diol, 3-methyl-1,5-pentane diol, 1,2-butanediol, 1,3-butanediol, 2-butyl-2-ethyl-1,3-propanediol, 1,2-propane diol, 2-methyl-1,3-propanediol, neopentyl glycol, 2-isopropyl-1,4-butanediol, 2,4-dimethyl-1,5-pentane diol, 2,4-di ethyl-1,5-pentane diol, 2-ethyl-1,3-hexanediol, 2-ethyl-1,6-hexanediol, 3,5-pentanediol, and 2-methyl-1,8-octane diol, and trimethylol propane, trimethylol ethane, pentaerythritol, and sorbitol. These compounds may be used alone or in combination of two or more.

Among ester-based polyols, an ester-based polyol having a liquid phase at room temperature may be easy to handle, may be difficult to aggregate in a coating composition, and may not generate spots on an image, and may be frequently used. Further, ester-based polyols having three or more hydroxyl groups may have a small amount of permanent deformation and good stability.

Examples of the aforementioned polybasic acid may include adipic acid, succinic acid, azeraic acid, sebacic acid, dodecanedicarboxylic acid, maleic anhydride, fumaric acid, 1,3-cyclopentanedicarboxylic acid, 1,4-cyclohexanedicarboxylic acid, and anhydrides thereof. These polybasic acids may be used alone or in combination of two or more.

As the polyether polyol having an ethylene oxide (EO) content of about 60 wt % to about 90 wt %, a bifunctional glycol or a trifunctional or more polyether polyol such as an ethylene oxide-polypropylene oxide copolymer may be used. In an example, the ethylene oxide-polypropylene oxide copolymer may be a random copolymer because hardness of the urethane resin may become low due to low crystallinity. The polyether polyol having an ethylene oxide (EO) content of about 60 wt % to about 90 wt % may be a polyether polyol produced by a random addition and/or block addition of alkylene oxides of 2 to 6 carbon atoms to the aforementioned compound having two or more hydroxyl groups. Examples of the polyether polyol may include polyoxyethylene polyoxypropylene polyol and polyoxyethylene polyoxytetramethylene polyol. For example, a trifunctional or more polyoxyethylene polyoxypropylene polyol having an ethylene oxide residue at its molecular end obtained by random addition polymerization of ethylene oxide and propylene oxide may be used. A trifunctional or more polyoxyethylene polyoxypropylene polyol may be employed to suppress image defect occurrence in low-temperature and low-humidity environments, as compared with a difunctional or less polyoxyethylene polyoxypropylene polyol.

As the polyisocyanate which undergoes chain-extension with the polyol mixture including a polyester polyol and a polyether polyol having an ethylene oxide (EO) content of about 60 wt % to about 90 wt %, toluene diisocyanate (TDI), diphenylmethane diisocyanate (MDI), isophorone diisocyanate (IPDI), hydrogenated diphenylmethane diisocyanate, hydrogenated toluene diisocyanate, or hexamethylene Diisocyanate (HDI) may be used. Further, blocked polyisocyanates obtained by reacting HDI and a blocking agent has storage stability because reactive isocyanate group is blocked to inhibit a reaction at room temperature. As the blocking agent, for example, methyl ethyl ketone oxime having good storage stability and productivity and capable of adjusting dissociation temperature in a range of about 120° C. to about 160° C. may be used. When the blocking agent is dissociated by heating, an isocyanate group is regenerated, and thus the blocked polyisocyanate may react with a polyol.

The amount of polyisocyanate added may be adjusted such that the molar ratio ([NCO]/[OH]) of isocyanate (NCO) groups of polyisocyanate to total hydroxyl (OH) groups of the polyol mixture is in a range of about 12 to about 25. Polyether polyols are likely to have a lower reactivity than that of polyester polyols, and unreacted products may be left when the molar ratio is less than 12, and low-temperature flexibility may deteriorate when the molar ratio is more than 25.

When a urethane resin is used as the binder resin of the surface layer 203, the surface layer 203 may contain a small amount of other resin components for the purpose of modifying the surface layer 203. As the other resin components, a silicone graft polymer, silicone oil, an acrylic resin, or a fluorine resin may be used for improving the stain resistance of the surface.

The surface layer 203 may include other additives such as a conducting agent, a leveling agent, a filler, an antifoaming agent, a surface modifier, a dispersant, and a charge control agent. In this case, as the conducting agent, an ion-conducting agent and/or an electron-conducting agent may used.

As the ion-conducting agent that may be used for the surface layer, there are alkali metal salts, alkaline earth metal salts, and quaternary ammonium salts, which may be used for the aforementioned conductive elastic body layer 202. For example, ionic liquid (3M™ Ionic Liquid Antistat FC-5000) represented by the chemical structure of $(n\text{-}Bu)_3MeN^{+-}N(SO_2CF_3)$ may be used as the ion-conducting agent because it has thermal stability and may thus be easily dispersed in the urethane resin. The amount of the ion-conducting agent combined may be in a range of about 0.01 parts by weight to about 10 parts by weight or in a range of about 0.5 parts by weight to about 5 parts by weight, based on 100 parts by weight of the urethane resin. As the electron-conducting agent that may be used for the surface layer 203, the aforementioned electron-conducting agent that may be used for the conductive elastic body layer 202 may be used. For example, oxidized carbon black having good dispersibility in the surface layer 203 may be used. Because the electron-conducting agent may have a small variation in electrical resistance, the amount of the electron-conducting agent combined may be in a range of about 0.5 parts by weight to about 10 parts by weight, based on 100 parts by weight of the urethane resin.

To charge the photoconductor stably, the surface layer 203 may contain particles forming unevenness on the surface thereof (i.e., particles for forming roughness). The particles for forming roughness may include resin particles or inorganic particles. Examples of the resin particles may include acrylic resin particles, styrene resin particles, polyamide resin particles, silicone resin particles, vinyl chloride resin particles, vinylidene chloride resin particles, acrylonitrile resin particles, fluorine resin particles, phenol resin particles, polyester resin particles, melamine resin particles, urethane resin particles, olefin resin particles, and epoxy resin particles. The inorganic particles may include silica particles, alumina particles, and the like.

In an example, when the surface layer 203 contains particles 203*b* such as acrylic resin particles having an average particle diameter of about 1 μm to about 50 μm as first particles such that the wear resistance and resistance to electrical deterioration of the charging rollers herein may increase, and charging non-uniformity may be effectively suppressed, so that the charging performance of the charging rollers may be sufficiently maintained even when the charging rollers are used for a longer period of time. The average particle diameter of the first particles may be in a range of about 1 μm to about 50 μm, for example, in a range from about 18 μm to about 27 μm. Accordingly, even when an example charging rollers herein are used in a contact charging manner, the ability to uniformly charge the photoconductor may be maintained for a longer period of time. Therefore, since the charging rollers herein may maintain the charging performance and charging uniformity even when the charging rollers are used for a longer time in the electrophotographic imaging apparatus, it is possible to stably obtain a high-quality image in which image defects such as background (BG) and micro-jitter are suppressed. Moreover, the charging rollers may maintain stable charging characteristics for a longer time even when a DC voltage is applied, high-quality output images may be obtained, and any issue of BG in low-temperature and low-humidity environments may be reduced or prevented. The average particle diameter of particles may be measured by a particle diameter distribution measuring device (manufacturer: Beckman Coulter®, trade name: Multisizer 3).

The content of the particles is in a range of about 1 parts by weight to about 50 parts by weight, for example, about 5 parts by weight to about 20 parts by weight, about 5 parts by weight to about 15 parts by weight, or about 10 parts by weight to about 15 parts by weight, based on 100 parts by weight of the binder resin. Stated differently, the content of the particles is in a range of above (phr) parts per hundred binder resin/rubber in the surface layer about 1 to about 50 phr, for example, about 5 to about 20 phr, about 5 to about 15 phr, or about 10 to about 15 phr.

The particles 203*b* can be acryl-based resin such as polyacrylate or polymethacrylate; polyamide-based resin such as nylon; polyolefin-based resin such as polyethylene or polypropylene; silicon-based resin; phenol-based resin; polyurethane-based resin; styrene-based resin; benzoguanamine resin; polyvinylidene fluoride-based resin; a metal oxide powder such as silica, alumina, a titanium oxide, and an iron oxide; boron nitride; silicon carbide; or a combination of at least two selected therefrom. The particles 203*b* can be spherical, plate, or irregular shaped. For instance, in some examples the particles 203*b* are spherical.

In some examples, the particles 203*b* can be acrylic resin particles. Examples of acrylic resin particles include polymethyl methacrylate (PMMA) particles and/or polymethyl acrylate (PMAA) particles. In the case of monodispersed acrylic particles, for example, monodispersed PMMA particles in which the average particle diameter of the particles is within the above range and 95% or more of the particles is included within the range of +2 μm of the average particle diameter of the particles, unevenness may be formed on the surface of the surface layer 203, and discharge points may be secured, so that charging characteristics are good. The reason for this may be that appropriate voids are formed in the nip of the contact portion of the photoconductor and the charging rollers herein, thereby improving charging performance.

In some examples, the particles 203*b* can include silica particles in addition to acryl-based resin particles. The spherical silica particles may be unaggregated silica particles, and may include spherical silica particles, roughly spherical silica particles, and elliptical silica particles. Silica particles may exist as aggregate particles in which small particles are aggregated, and such aggregate particles are irregular-shaped particles, not spherical silica particles. Since the aggregate silica particles are difficult to stably provide an uneven shape to the surface layer 203, and the aggregation thereof is partially broken by dispersion by a bead mill or the like, the aggregate silica particles are not suitable as particles for imparting uniform uneven surface shape to the surface layer 203. In order for the charging rollers herein to exhibit various technical aspects described above, the specific surface area of the spherical silica particles may be adjusted in a range of about 3 $m^2/g$ to about 50 $m^2/g$, for example, about 10 $m^2/g$ to about 50 $m^2/g$, about 20 $m^2/g$ to about 50 $m^2/g$, or about 30 $m^2/g$ to 50 $m^2/g$ so as to improve charging ability and charging uniformity. The specific surface area of the particles such as the silica particles may be measured by a specific surface area/pore size distribution measurement instrument (manufacturer: Microtrac BEL, trade name: BELSORP-miniX). In the case where the silica particles have the same particle diameter, as the specific surface area of the silica particles increases, the silica particles are closer to porous particles.

As illustrated in the FIG. 2, the particles 203*b* can be entirely disposed in the binder resin 203*a* and thus can form portions of the binder resin that protrude above other portions of the binder resin which do not include the particles 203*b*. Having the particles 203*b* be entirely disposed in the binder resin 203*a* can promotes aspects herein such as having a given Spk value.

As mentioned, the particles can be present in a first portion or first area the binder resin of the surface layer 203. For instance, the particles 203*b* can be present in a first portion 205 of the binder resin 203*a*, as illustrated in FIG. 2. Stated differently, the particles 203*b* are present along a plane extending in the A direction (illustrated in FIG. 2) in the first portion 205 of the binder resin 203*a*. Conversely, there is an absence of the particles in a second portion or second area of the binder resin of the surface layer 203. For instance, there is an absence of the particles 203*b* in the second portion 207 of the binder resin 203*a*. Stated differently, the particles 203*b* are not present along a plane extending in the A direction in the binder resin 203*a* in the second portion 207 of the binder resin 203*a*.

When using the charging rollers herein having the surface layer 203 satisfying the above-described conditions, stable charging characteristics may be maintained for a longer period of time even when a DC voltage is applied, and high-quality output images may be obtained. A mechanism by which such an effect is exhibited may be presumed as follows. To maintain good charging characteristics over a longer period of time, particles are added to the surface layer 203, which is the outermost layer of a charging member. However, when a voltage is applied to such a charging member, an electric field is concentrated on the convex portions formed by the particles. As a result, discharge tends to be generated by the convex portions, and the quality of the output image tends to deteriorate. In an example, since discharge from the convex portions may be weakened by making the surface layer 203 satisfy the above-described conditions, it is presumed that non-uniformity of the electric field on the surface of the conductive resin layer, i.e., the surface layer 203 is weakened. Thus, it is presumed that uniform discharge may occur from the entire surface of the conductive resin layer, and the quality of an output image may be improved.

Accordingly, the charging rollers herein may maintain the ability to uniformly charge the photoconductor over a longer period even when it is used in a contact charging manner. Therefore, since the charging roller herein can maintain charging performance and charging uniformity even when the charging rollers are used for a longer time in an electrophotographic imaging apparatus, it is possible to stably obtain high quality images in which image defects such that both background (BG) and micro-jitter are suppressed. Moreover, the charging roller herein may maintain stable charging characteristics over a longer period of time even when a DC voltage is applied, high-quality output images may be obtained, and an occurrence of BG under low-temperature and low-moisture environments may be reduced or prevented.

In some examples, the second portion has a peak height (Spk)/core roughness depth (Sk) the second portion in a range from about 0.04 to about 0.2. For example, the Spk/Sk of the second portion can be less than about 0.2, less than about 0.19, less than about 0.18, less than about 0.16, less than about 0.14, less than about 0.12, or less than about 0.10. For instance, the second portion can have a Spk/(Sk) of less than 0.2.

In some examples, the Spk/Sk of the first portion/the Spk/Sk of the second portion is in a range from about 8 to about 76 or from about 10 to about 76. In some examples, the Spk/Sk of the first portion/the Spk/Sk of the second portion is greater than about 10 is greater than about 8, is greater than about 12, or is greater than about 14. For instance, the Spk/Sk of the first portion/the Spk/Sk of the second portion can be greater than 8 or greater than 10.

In some examples, a sum of the Spk of the first portion plus the Sk of first portion is in a range from about 8 to about 30, in a range from about 8 to about 20, or in a range from about 15 to about 20. In some examples, the sum of the Spk/Sk of the first portion and the Spk/Sk of the first portion is greater than about 8, is greater than about 10, is greater than about 12, or is greater than about 15. For instance, the sum of the Spk/Sk of the first portion and the Spk/Sk of the second portion can be greater than 8.

A thickness of the surface layer 532 may be in a range of about 0.1 μm to about 100 μm, or, for example, about 3 μm to about 30 μm. The thickness of the surface layer 203 may be a layer thickness (as take in the 'A' direction at the portion of FIG. 2) of the portion formed by the binder resin alone. For example, the thickness of the conductive resin layer is a thickness of the binder resin at a point such as an intermediate point between neighboring particles. The thickness of the surface layer 203 may be measured by cutting out the charging roller cross section with a sharp blade and observing the piece with an optical microscope or an electron microscope.

In an example, a DC voltage is applied to the charging rollers herein (e.g., charging roller 100 as illustrated in FIG. 1). For example, the bias voltage applied during image output may be about −1500 V to about −1000 V. This may assist in controlling the image density and various conditions while maintaining the charging performance under various environments. When the bias voltage is higher than −1000 V, it becomes difficult to optimize the developing conditions for image formation. In contrast, when the bias voltage is lower than-1500 V, over-discharge tends to occur in the particle portions of the conductive resin layer, and white spot-like image defects tend to occur after image formation.

Method of Manufacturing Charging Member

The charging member of the example shown in FIG. 1 may be manufactured as follows. In an example method, components of the materials for the conductive elastic body layer 102 are kneaded using a kneader to prepare materials for the conductive elastic body layer 102. The materials for the surface layer 103 are kneaded using a kneader such as a roll to obtain a mixture, and an organic solvent is added to this mixture, mixed and stirred, thereby preparing a coating liquid for the surface layer 103. A mold for injection molding, which is provided with a core (usually a shaft) serving as the conductive support 101 therein, is filled with the materials for the conductive elastic body layer 102 by injecting the materials, followed by heating and crosslinking under predetermined conditions. Demolding is performed to a base roll in which the conductive elastic body layer 102 is formed along the outer circumference surface of the conductive support 101. The coating liquid for the surface layer 103 is applied onto the outer circumference surface of the base roll to form the surface layer 103. In this way, a charging roller 10 in which the conductive elastic body layer 102 is formed on the outer circumference surface of the conductive support 101 and the surface layer 103 is formed on the outer circumference of the conductive elastic body layer 102 may be manufactured.

However, the method of forming the conductive elastic body layer 102 is not limited to injection molding, and casting, press molding, polishing, or a combination thereof may be employed. The method of applying the coating liquid for the surface layer 103 is not particularly limited, and dipping, spray coating, and roll coating may be employed.

Electrophotographic Imaging Apparatus

A charging roller according to an example may be integrated into an electrophotographic cartridge or an electrophotographic imaging apparatus such as a printer, a copier, a scanner, a fax machine, or a multifunction peripheral incorporating two or more of these.

Figure 3:
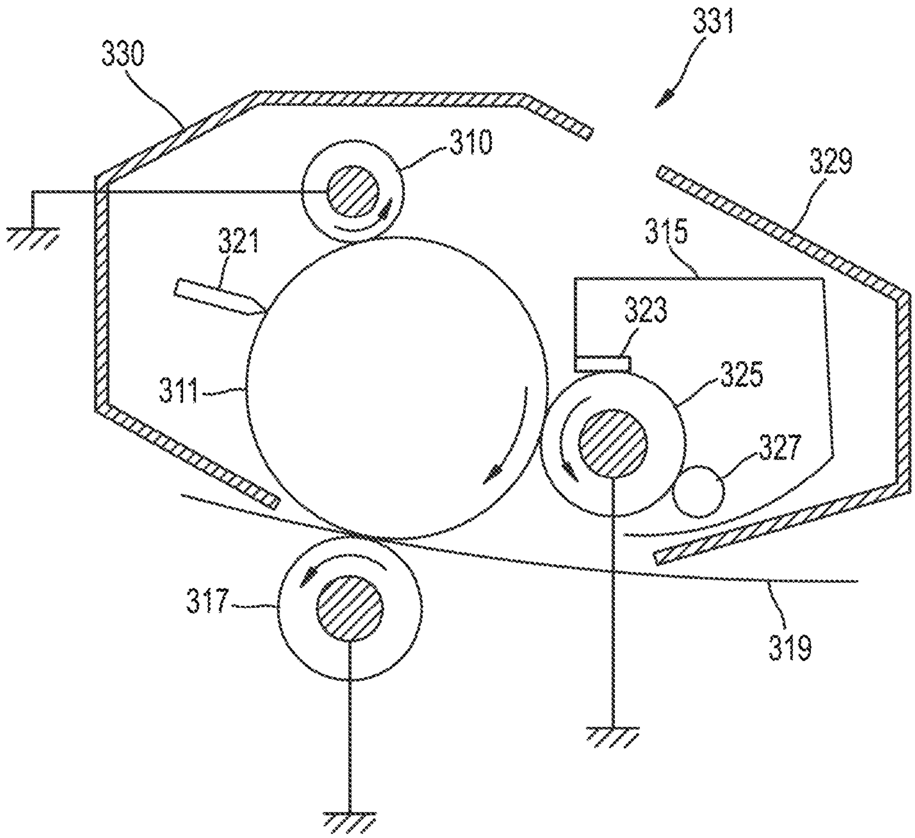
FIG. 3 is a cross-sectional view schematically illustrating an electrophotographic imaging apparatus and an electrophotographic cartridge including an example of a charging member according to an example.

FIG. 3 is a cross-sectional view schematically illustrating an electrophotographic imaging apparatus and an electrophotographic cartridge including a charging roller according to an example.

Referring to FIG. 3, an electrophotographic imaging apparatus 331 may include an electrophotographic cartridge 330. The electrophotographic cartridge may include an electrophotographic photoconductor drum 311 that is charged by a charging roller 300 according to an example, which is a charging means disposed in contact with the electrophotographic photoconductor drum 311. The electrophotographic photoconductor drum 311 may be rotationally driven at a predetermined circumferential speed about an axis. The electrophotographic photoconductor drum 311 may be subjected to uniform charging of a positive or a negative predetermined potential on its surface by the charging roller 310 in the rotation process. The voltage applied to the charging roller 310 may be, for example, a DC voltage. However, the voltage applied to the charging roller 310 may be, for example, a combination of an AC voltage and a DC voltage. In the electrophotographic imaging apparatus 331 according to an example, even when a DC voltage is applied to the charging roller 310, stable charging characteristics may be maintained for a longer period of time, and a high-quality output image may be obtained.

The charging roller 310 may charge the surface of the electrophotographic photoconductor drum 311 to a uniform potential value while rotating in contact with the electrophotographic photoconductor drum 311. The image portion is exposed by laser light to form an electrostatic latent image on the electrophotographic photoconductor drum 311. After the electrostatic latent image is made a visible image, for example, a toner image, by a developing unit 315, the toner image is transferred to an image receiving member 319 such as paper by a transfer unit such as the transfer roller 317 to which a voltage is applied. Toner remaining on a surface of the electrophotographic photoconductor drum 311 after the image transfer is cleaned by a cleaning unit, for example, a cleaning blade 321. The electrophotographic photoconductor drum 311 may be used again for image formation. The developing unit 315 includes a regulating blade 323, a developing roller 325, and a supply roller 327.

The electrophotographic cartridge 330 according to an example may integrally support the electrophotographic photoconductor drum 311, the charging roller 300, and the cleaning blade 321, may be attached to the electrophotographic imaging apparatus 331, and may be detached from the electrophotographic imaging apparatus 331. Another cartridge 329 may integrally support the developing unit 315 including the regulating blade 323, the developing roller 325, and the supply roller 327, and may be attached to the electrophotographic imaging apparatus 331, and may be detached from the electrophotographic imaging apparatus 331. Toner (not shown) may be located inside the developing unit 315.

EXAMPLES

Hereinafter, various examples will be described. However, the scope of the disclosure is not limited thereto.

Formation of Conductive Elastic Body layer

An adhesive was applied to a cylindrical stainless-steel shaft having a diameter of 8 mm and a total length of 324 mm (the surface thereof was electroless plated with nickel) and was dried. This shaft was used as a support. 100 parts by weight of epichlorohydrin rubber (Manufacturer: Daiso Chemical Co., Ltd., product name: EPICHLOMER DG), 20 parts by weight of calcium carbonate, 2 parts by weight of carbon black (Manufacturer: Mitsubishi Chemical Corporation, product name: MA100) as a filler, 5 parts by weight of zinc oxide, and 2 parts by weight of tetrabutylammonium chloride as an ion-conducting agent were put into a hermetic mixer and kneaded for 20 minutes, and then 1.5 parts by weight of dibenzothiazyl disulfide as a vulcanization accelerator, 1.2 parts by weight of dipentamethylene thiuram tetrasulfide, and 1.0 part by weight of sulfur as a crosslinking agent were further added thereto and kneaded in an open roll for about 15 minutes to obtain a rubber composition. This rubber composition was extruded together with the shaft using a crosshead rubber extruder to be formed into a roller shape having an outer diameter of about 13 mm. Next, after a vulcanization process was performed in a vulcanization tube at about 160° C. for about 1.5 hours, both ends of the rubber were cut, the surface of the rubber was polished such that the outer diameter of the center portion of the roller became about 12 mm, and then the surface thereof was washed, dried and then irradiated with ultraviolet light to form a conductive elastic body layer (e.g., conductive elastic body layer 102). Thus, a conductive elastic body layer having a thickness of about 4 mm and formed along the outer circumference surface of the shaft was obtained.

Formation of Conductive Surface Layer

Examples 1 to 11 and Comparative Examples 1 to 10

69.26 parts by weight of a polycaprolactone polyol (Manufacturer: Daicel Chemical Industries, product name: PCL320, hydroxyl value: 84 KOH mg/g), 51.24 parts by weight of isocyanate-type blocked HDI (Manufacturer: Aekyung Chemical Co., Ltd., product name: D660, non-volatile matter 60%, NCO 6.5%, blocking agent: methyl ethyl ketone oxime), 1 part by weight of a polymer dispersant (Manufacturer: Lubrizol Co., Ltd., product name: SOLSPERSE™ 20000), 3 parts by weight of carbon black (Manufacturer: Mitsubishi Chemical Corporation, product name: MA100, specific surface area: 110 $m^2/g$, pH 3.5), 2 parts by weight of hydrophobic fumed silica (Manufacturer: Evonik Resource Efficiency GmbH, trade name: AEROSIL R 974, specific surface area: 110 $m^2/g$), and 0.1 parts by weight of silicone oil (Manufacturer: ShineEtsu Chemical Co., Ltd., product name: KF6002) were mixed with 200 parts by weight of a methyl isobutyl ketone (MIBK) solvent.

Then, resin particles and/or inorganic particles were added amounts are given in Tables 1, 2A, 2B, 3A, and 3B according to Examples and Comparative Examples were added as roughness forming particles. Then the particles were sufficiently stirred until the coating liquid became uniform to prepare a coating liquid for forming the surface layer.

The coating liquid for forming the surface layer was applied to the surface of the roller having the conductive elastic body layer by a roll coating method. In this case, to obtain a particular layer thickness, coating was performed while scraping off additional coating liquid with a scraper. The coated roller was air-dried for about 10 minutes and then dried at 160° C. for about 1 hour using an oven. Thus, a charging roller in which the surface layer having a thickness of about 1.0 μm is laminated on the conductive elastic body layer was obtained. Thus, a charging roller including the shaft, which is the conductive support, the conductive elastic body layer laminated along the outer circumference surface of the shaft, and the surface layer laminated along the outer circumference surface of the conductive elastic body layer was manufactured.

The types and properties of the resin particles or inorganic particles used in Examples 1 to 11 and Comparative Examples 1 to 10 are summarized in Table 1. The evaluation results of the charging rollers are summarized in Tables 2A, 2B, 3A, and 3B.

TABLE 1

| Product name | Manufacturer | Particle type | Average particle diameter (μm) | Shape |
|---|---|---|---|---|
| SSX-103 | Sekisui Plastics | Monodispersed crosslinked PMMA resin | 3 | Spherical |
| SSX-105 | Sekisui Plastics | Monodispersed crosslinked PMMA resin | 5 | Spherical |
| N/A | Sunjin | Nylon 12 | 5 | irregular |
| SSX-110 | Sekisui Plastics | Monodispersed crosslinked PMMA resin | 10 | Spherical |
| SSX-115 | Sekisui Plastics | Monodispersed crosslinked PMMA resin | 15 | Spherical |
| SSX-118 | Sekisui Plastics | Monodispersed crosslinked PMMA resin | 18 | Spherical |
| SSX-120 | Sekisui Plastics | Monodispersed crosslinked PMMA resin | 20 | Spherical |
| SSX-122 | Sekisui Plastics | Monodispersed crosslinked PMMA resin | 22 | Spherical |
| SSX-127 | Sekisui Plastics | Monodispersed crosslinked PMMA resin | 27 | Spherical |
| N/A | Sunjin | Nylon 12 | 27 | Irregular |

"N/A" refers to an product without a commercial product name.

TABLE 2A

| Examples(Ex) | | 1 | 2 | 3 | 4 | 5 | 6 |
|---|---|---|---|---|---|---|---|
| First Particle (phr) | SSX-105 | — | — | — | — | — | — |
| | SSX-110 | — | — | — | — | — | — |
| | SSX-115 | — | — | — | — | — | — |
| | SSX-118 | — | — | — | 15 | — | — |
| | SSX-120 | — | 10 | 15 | — | — | — |
| | SSX-122 | — | — | — | — | 15 | — |
| | SSX-127 (phr) | 15 | — | — | — | — | 10 |
| Second Particle (phr) | — | — | — | — | — | — | — |
| | — | — | — | — | — | — | — |
| | — | — | — | — | — | — | — |
| Spk (area without particles) | | 0.214 | 0.617 | 0.478 | 0.684 | 0.649 | 0.811 |
| SK (area without particles) | | 5.138 | 3.481 | 3.879 | 3.578 | 4.144 | 5.331 |
| Spk/Sk (area without particles) | | 0.04 | 0.18 | 0.12 | 0.19 | 0.16 | 0.15 |
| Image after printing 350,000 sheets of paper | 2D noise | ○ | ○ | ○ | ◎ | ◎ | ○ |
| | Micro-jitter | ○ | ○ | ○ | ○ | ◎ | ○ |
| | Background | ◎ | ○ | ◎ | ◎ | ◎ | ◎ |

EXAMPLES

TABLE 2A

| Examples(Ex) | | 7 | 8 | 9 | 10 | 11 |
|---|---|---|---|---|---|---|
| First Particle (phr) | SSX-105 | — | — | — | — | — |
| | SSX-110 | — | — | — | — | — |
| | SSX-115 | — | — | — | — | — |
| | SSX-118 | — | — | — | 15 | — |
| | SSX-120 | — | 10 | 15 | — | — |
| | SSX-122 | — | — | — | — | 15 |
| | SSX-127 | 15 | — | — | — | — |
| Second Particle (phr) | — | — | — | — | — | — |
| | — | — | — | — | — | — |
| | — | — | — | — | — | — |
| Spk (area w/o particles) | | 0.214 | 0.617 | 0.478 | 0.684 | 0.649 |

TABLE 2A-continued

| Examples(Ex) | | 7 | 8 | 9 | 10 | 11 |
|---|---|---|---|---|---|---|
| Sk (area w/o particles) | | 5.138 | 3.481 | 3.879 | 3.578 | 4.144 |
| Spk/Sk (area w/o particles) | | 0.04 | 0.18 | 0.12 | 0.19 | 0.16 |
| Spk (area with particles) | | 15.72 | 13.54 | 11.25 | 13.52 | 13.66 |
| Sk (area with particles) | | 4.99 | 5.20 | 9.13 | 2.19 | 7.07 |
| Spk/Sk (area with particles) | | 3.15 | 2.60 | 1.23 | 6.18 | 1.93 |
| Spk/Sk (B)/Spk/Sk (A) | | 75.51 | 14.68 | 10.01 | 32.32 | 12.34 |
| Image after printing 350,000 sheets of paper | M/J | ◎ | ◎ | ○ | ○ | ○ |
| | 2D Noise | ○ | ◎ | ◎ | ○ | ◎ |
| | B/G | ○ | ○ | ◎ | ○ | ◎ |

TABLE 3A

| Comparative Examples (CE) | | CE1 | CE2 | CE3 | CE4 | CE5 | CE6 |
|---|---|---|---|---|---|---|---|
| First particle (phr) | SSX-105 | — | — | — | — | — | — |
| | SSX-110 | — | — | — | — | — | — |
| | SSX-115 | — | — | — | — | — | — |
| | SSX-118 | — | — | — | — | 10 | — |
| | SSX-120 | — | — | — | — | — | — |
| | SSX-122 | 5 | — | — | — | — | — |
| | SSX-127 | — | — | 5 | — | — | — |
| | Nylon12, 27 um | — | — | — | 5 | — | 15 |
| Second particle (phr) | SSX-103 | 20 | — | — | — | — | — |
| | Nyon12, 5 um | — | — | 15 | — | — | — |
| | SSX-105 | — | — | — | 10 | — | — |
| | — | — | — | — | — | — | — |
| | — | — | — | — | — | — | — |
| Spk (area w/o particles) | | 2.412 | 4.195 | 0.967 | 1.101 | 2.024 | 0.427 |
| Sk (area w/o particles) | | 0.778 | 9.854 | 1.282 | 2.488 | 9.68 | 0.903 |
| Spk/Sk (area w/o particles) | | 3.10 | 0.43 | 0.75 | 0.44 | 0.21 | 0.47 |
| Image after printing 30,000 sheets of paper | 2D Noise | X | X | Δ | ○ | ○ | ○ |
| | M/J | X | X | X | X | X | X |
| | B/G | ○ | ○ | ○ | ◎ | ○ | ◎ |

* CE: Comparative Example

TABLE 3B

| Comparative Examples (CE) | | CE7 | CE8 | CE9 | CE10 |
|---|---|---|---|---|---|
| First particle (phr) | SSX-105 | — | — | — | — |
| | SSX-110 | — | — | — | — |
| | SSX-115 | — | — | — | — |
| | SSX-118 | — | — | — | — |
| | SSX-120 | — | — | — | — |
| | SSX-122 | 5 | — | — | — |
| | SSX-127 | — | — | 5 | 15 |
| | Nylon12, 27 um | — | 5 | — | — |
| Second particle (phr) | SSX-103 | 20 | — | — | — |
| | SSX-105 | — | — | 10 | — |
| | Nyon 12, 5 um | — | 15 | — | — |
| | — | — | — | — | — |
| Spk (area w/o particles) | | 2.413 | 0.967 | 1.101 | 0.427 |
| Sk (area w/o particles) | | 0.778 | 1.282 | 2.49 | 0.903 |
| Spk/Sk (A) (area w/o particles) | | 3.10 | 0.75 | 0.44 | 0.47 |
| Spk (area with particles) | | 8.56 | 12.88 | 15.59 | 13.63 |
| Sk (area with particles) | | 4.47 | 2.86 | 4.47 | 2.97 |
| Spk/Sk (B) (area with particles) | | 1.92 | 4.49 | 3.49 | 4.60 |
| Spk/Sk (B)/Spk/Sk (A) | | 0.62 | 5.95 | 7.88 | 9.72 |
| Image after printing 30,000 sheets of paper | M/J | X | X | X | X |
| | 2D nois | X | Δ | Δ | ○ |
| | B/Gy | ○ | ○ | ◎ | ◎ |

Surface Layer Evaluation:

Reduced peak height (Spk) and core roughness depth or core height (Sk) were determined using available methodology. For instance, an image of the surface of the charging roller was captured by the laser microscope VK-X100 manufactured by KEYENCE with an objective lens of 50× magnification, thus three-dimensional height data having an area of 280 μm (width)×210 μm (length) was obtained, and autocorrection was performed on the curvature of the surface. The measurements were performed for an initial image (after printing 20 sheets) and a subsequent image (after printing 350,000 sheets). The reduced peak height Spk and the core height Sk were obtained by using a multi-file analysis application conforming to ISO 25178 manufactured by KEYENCE.

Image Evaluation:

Image evaluations in the case of using the charging rollers obtained in Examples 1 to 11 and Comparative Examples 1 to 10 are performed as follows. After removing the charging roller from a commercially available laser printer (Manufacturer: HP, Model: HP 50 PPM Color LaserJet A3), each of the charging rollers obtained in Examples 1 to 11 and Comparative Examples 1 to 11 was mounted thereon instead of the above charging roller. The printer was left for 8 hours under N/N (temperature 23° C. and relative humidity 55%) environmental conditions. Regarding the initial image obtained using this printer and the image after printing 350,000 sheets of paper, micro-jitter (M/J), background (B/G), and image uniformity were evaluated as follows. The results thereof are summarized in Tables 2A, 2B, 3A and 3B. In this case, printing conditions were as follows.

Printing speed: typical speed 500 mm/sec;

Print paper type: Office Paper EC;

Applied bias: a DC voltage applied to the charging roller contacting the photoconductor is appropriately adjusted such that the photoconductor surface potential is −600 V.

Evaluation of Micro-Jitter (M/J)

The electrophotographic image for micro-jitter evaluation was a half-tone image (medium-concentration image having horizontal stripes of width 1 dot and interval 2 dots in a direction perpendicular to the rotation direction of the photoconductor). This image was observed, and the presence or absence and/or degree of fine horizontal stripes (micro-jitter (M/J)) was evaluated according to the following criteria.

◎: Micro-jitter does not appear in the image at all;

○: Micro-jitter appears slightly on a part of the image, but there is no practical issue;

Δ: Micro-jitter appears slightly at the front of the image, but this is within the usable range; and x: Micro-jitter appears at the front of the image, thus causing practical issue.

Evaluation of Background (B/G)

The electrophotographic image for background evaluation is a white image with a medium concentration (density). The whiteness of this output image was measured by "Reflectometer" (Manufacturer: Nippon Denshoku Ind. Ltd., Model Name: Microscopic Area Color Meter/Reflectometer VSR 400). Then, the background concentration (background density) (%) was calculated from a difference between whiteness of the output image and whiteness of the paper. The image background was evaluated according to the following criteria.

◎: background density is less than 0.8% (optimally usable);

○: background density is 0.8% or greater and less than 1.5% (usable);

Δ: background density is 1.5% or greater and less than 2.5% (in some cases, usable); and x: background density is 2.5% or greater (not usable).

Evaluation of Image Uniformity (2D Noise)

The electrophotographic image for image uniformity evaluation, similarly to electrophotographic image for micro-jitter evaluation, is a half-tone image (medium-density image having horizontal stripes of width 2 dots and interval 2 dots in a direction perpendicular to the rotation direction of the photoconductor). This image was observed, and image uniformity was evaluated according to the following criteria.

◎: image density unevenness (so called, image stains) does not exist;

○: image density unevenness does not exist, but image has slight granularity;

Δ: image density unevenness slightly exists to such a degree of no practical issue; and x: image density unevenness exists to impair image quality.

Referring to Tables 2A, 2B, 3A and 3B, it may be found that an example imaging apparatus provided with the charging member of Examples 1 to 11 in which the particles have a diameter in a given range such as a diameter in a range from 1 microns (μm) to about 35 μm (e.g., from about 18 μm to about 27 μm) and a reduced peak height (Spk)/core roughness depth (Sk) of the first portion/a Spk/Sk of the second portion is >10 and/or the Spk/Sk of the first portion/the Spk/Sk of the second portion is >10 may stably generate high-quality images having no image defects such as background (B/G), micro-jitter (M/J), and image density unevenness. A reason for this may be that given diameter of particles (e.g., beads) yields improved abrasion resistance and thus may maintain stable charging characteristics over an operational lifetime of the charging member. Conversely, if a larger particle diameter/range is used, M/J is satisfied but 2D noise occurs, and if a smaller particle diameter/range is used, 2D noise is satisfied but M/J occurs.

Although examples of the disclosure have been illustrated and described hereinabove, the disclosure is not limited thereto, and may be variously modified and altered by those skilled in the art to which the disclosure pertains without departing from the spirit and scope of the disclosure claimed in the claims. These modifications and alterations are to fall within the scope of the disclosure.

It will be understood that when an element is referred to as being "on," "connected to", "coupled to", or "coupled with" another element, it can be directly on, connected, or coupled with the other element or intervening elements may be present. In contrast, when an object is "directly coupled to" or "directly coupled with" another element it is understood that are no intervening elements (adhesives, screws, other elements) etc. As used herein the term "about" refers to value(s) that are within 10 percent, within 5 percent or within 1 percent of a given value that the term about modifies. For instance, the term about can refer to a value(s) that are within 10 percent of a given value.

The figures herein follow a numbering convention in which the first digit corresponds to the drawing figure number and the remaining digits identify an element or component in the drawing. For example, reference numeral 103 may refer to element 103 in FIG. 1 and an analogous element may be identified by reference numeral 203 in FIG. 2. Elements shown in the various figures herein can be added, exchanged, and/or eliminated to provide additional examples of the disclosure. In addition, the proportion and the relative scale of the elements provided in the figures are intended to illustrate the examples of the disclosure, and should not be taken in a limiting sense.

What is claimed is:

1. A charging member, comprising:

a conductive support;

a conductive elastic body layer on the conductive support; and a surface layer on the conductive elastic body layer, wherein the surface layer consists of a binder resin, particles having an average particle size of from 21 microns to about 35 microns, and optionally a conducting agent, and wherein the surface layer includes a first portion of the binder resin having the particles and a second portion of the binder resin having an absence of the particles, and wherein the second portion has a peak height (Spk)/core roughness depth (Sk) of less than 0.2.

2. The charging member of claim 1, wherein the average particle size of the particles ranges from 22 μm to about 35 μm.

3. The charging member of claim 1, wherein the particles are present in an amount of from about 1 part by weight to about 50 parts by weight, based on 100 parts by weight of the binder resin.

4. The charging member of claim 1, wherein the binder resin is a urethane resin.

5. The charging member of claim 1, wherein a Spk/Sk of the first portion/the Spk/Sk of the second portion is >10.

6. The charging member of claim 1, wherein the average particle size of the particles ranges from 22 microns to about 27 microns.

7. The charging member of claim 1, wherein the particles comprise acrylic resin particles, and wherein the acrylic resin particles are polymethyl methacrylate (PMMA) particles or polymethyl acrylate (PMAA) particles.

8. The charging member of claim 1, wherein the charging member is a charging roller.

9. A cartridge for an electrophotographic imaging apparatus, the cartridge comprising:

a conductive support;

a conductive elastic body layer on the conductive support; and a surface layer on the conductive elastic body layer, wherein the surface layer consists of a binder resin, particles having an average particle size of from 21 microns to about 35 microns, and optionally a conducting agent, wherein the surface layer includes a first portion of the binder resin having the particles disposed in the binder resin and a second portion of the binder resin having an absence of the particles disposed in the binder resin, and wherein a peak height (Spk)/core roughness depth (Sk) of the first portion/a Spk/Sk of the second portion is>10.

10. The cartridge of claim 9, wherein the Spk/Sk of the second portion is less than 0.2.

11. The cartridge of claim 9, wherein a sum of the Spk of the first portion and the Sk of the first portion is greater than 8.

12. The cartridge of claim 9, wherein:

the binder resin is selected from the group consisting of a fluorine resin, a polyamide resin, an acrylic resin, a nylon resin, a urethane resin, a silicone resin, a butyral resin, styrene-ethylene/butylene-olefin copolymer (SEBC), olefin-ethylene/butylene-olefin copolymer (CEBC), and a combination thereof; and the particles are present in an amount of from about 5 parts by weight to about 20 parts by weight, based on 100 parts by weight of the binder resin.

13. An electrophotographic imaging apparatus, comprising:

an electrophotographic photoconductor; and a charging member to contact the electrophotographic photoconductor to charge the electrophotographic photoconductor, the charging member comprising:

a conductive support;

a conductive elastic body layer on the conductive support; and a surface layer on the conductive elastic body layer, the surface layer consisting of a binder resin, particles having an average particle size of from 21 microns to about 35 microns, and optionally a conducting agent, wherein the surface layer has a first portion including the particles and a second portion with an absence of the particles, and wherein:

a reduced peak height (Spk)/core roughness depth (Sk) of the first portion/a Spk/Sk of the second portion is >10; and the second portion has a Spk/Sk of less than 0.2.

14. The electrophotographic imaging apparatus of claim 13, further comprising:

an exposure unit to form an electrostatic latent image on the surface layer;

a developing unit to develop the electrostatic latent image to a visible image; and a transfer unit to transfer the visible image onto an image receiving member.

* * * * *